United States Patent
Peng

(10) Patent No.: US 9,632,242 B2
(45) Date of Patent: *Apr. 25, 2017

(54) LIGHT DELIVERY GUIDE

(71) Applicant: SEAGATE TECHNOLOGY LLC, Cupertino, CA (US)

(72) Inventor: Chubing Peng, Minnetonka, MN (US)

(73) Assignee: Seagate Technology LLC, Cupertino, CA (US)

(*) Notice: Subject to any disclaimer, the term of this patent is extended or adjusted under 35 U.S.C. 154(b) by 494 days.

This patent is subject to a terminal disclaimer.

(21) Appl. No.: 13/779,853

(22) Filed: Feb. 28, 2013

(65) Prior Publication Data

US 2013/0176839 A1 Jul. 11, 2013

Related U.S. Application Data

(63) Continuation of application No. 13/248,565, filed on Sep. 29, 2011, now Pat. No. 8,411,536.

(51) Int. Cl.

| G11B 11/00 | (2006.01) |
|---|---|
| G02B 6/028 | (2006.01) |
| G11B 13/04 | (2006.01) |
| G11B 5/31 | (2006.01) |
| G02B 6/42 | (2006.01) |
| G02B 6/122 | (2006.01) |
| G11B 5/012 | (2006.01) |
| G11B 5/00 | (2006.01) |
| G02B 6/12 | (2006.01) |

(52) U.S. Cl.
CPC ......... *G02B 6/0285* (2013.01); *G02B 6/1228* (2013.01); *G02B 6/42* (2013.01); *G11B 5/012* (2013.01); *G11B 5/314* (2013.01); *G11B 13/04* (2013.01); *G02B 2006/12095* (2013.01); *G11B 2005/0021* (2013.01)

(58) Field of Classification Search
None
See application file for complete search history.

(56) References Cited

U.S. PATENT DOCUMENTS

| 6,950,598 B1 | 9/2005 | Tawa |
|---|---|---|
| 8,385,183 B2 | 2/2013 | Peng |
| 2006/0029348 A1 | 2/2006 | Kempen |

(Continued)

FOREIGN PATENT DOCUMENTS

| JP | 2006-073105 | 3/2006 |
|---|---|---|
| JP | 2011-100535 | 5/2011 |

*Primary Examiner* — Ilana Spar
*Assistant Examiner* — Henok Heyi
(74) *Attorney, Agent, or Firm* — Meuting, Raasch & Gebhardt, P.A.

(57) ABSTRACT

A waveguide that includes a first cladding layer, the first cladding layer having an index of refraction, $n_3$; a gradient index layer positioned adjacent the first cladding layer; an assist layer positioned adjacent the gradient index layer, the assist layer having an index of refraction, $n_2$; a core layer positioned adjacent the assist layer, the core layer having an index of refraction, $n_1$; and a second cladding layer, the second cladding layer having an index of refraction, $n_4$, wherein $n_1$ is greater than $n_2$, $n_3$, and $n_4$; and $n_2$ is greater than $n_3$ and $n_4$.

20 Claims, 7 Drawing Sheets

(56) References Cited

U.S. PATENT DOCUMENTS

| | | |
|---|---|---|
| 2006/0062521 A1 | 3/2006 | Zhou |
| 2007/0116409 A1* | 5/2007 | Bryan et al. ............... 385/33 |
| 2010/0074063 A1 | 3/2010 | Peng |
| 2010/0196588 A1 | 8/2010 | Lao |
| 2010/0251043 A1 | 9/2010 | Anzou |
| 2011/0090770 A1* | 4/2011 | Iwanabe et al. .......... 369/13.24 |
| 2011/0103201 A1 | 5/2011 | Peng |
| 2012/0070784 A1 | 3/2012 | Balamane |
| 2012/0257490 A1* | 10/2012 | Zhou ........................ 369/121 |
| 2012/0275280 A1 | 11/2012 | Miyauchi |
| 2013/0068722 A1* | 3/2013 | Sasaki et al. ............... 216/24 |

* cited by examiner

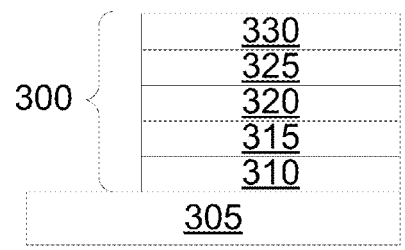
FIG. 3
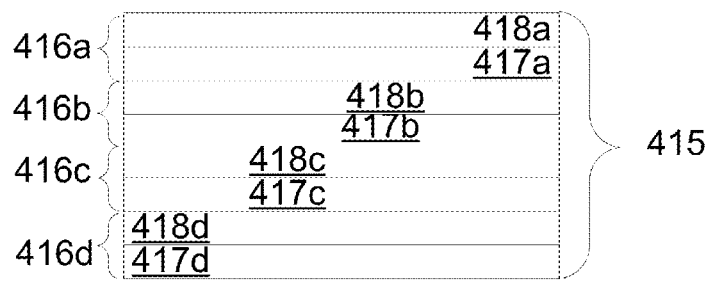
FIG. 4A
FIG. 4B
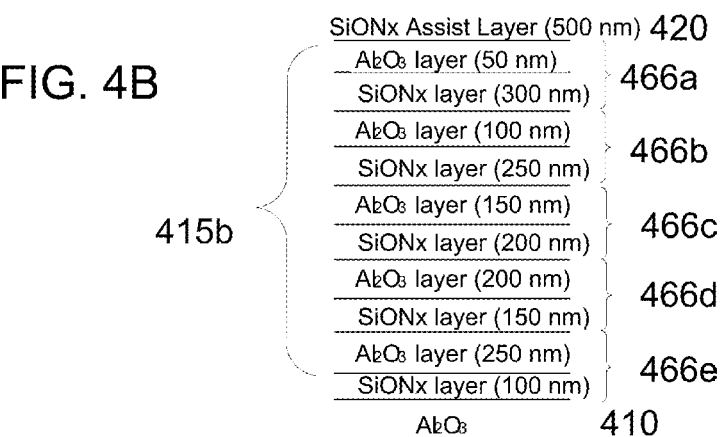

LIGHT DELIVERY GUIDE

RELATED APPLICATION

This application is a continuation of U.S. application Ser. No. 13/248,565, filed Sep. 29, 2011. The entire disclosure of this application is incorporated herein by reference.

BACKGROUND

"Heat assisted magnetic recording," optical assisted recording or thermal assisted recording (collectively hereinafter HAMR), generally refers to the concept of locally heating a recording medium to reduce the coercivity of the recording medium so that an applied magnetic writing field can more easily affect magnetization of the recording medium during a temporary magnetic softening of the recording medium caused by the local heating. HAMR allows for the use of small grain media, which is desirable for recording at increased areal densities, with a larger magnetic anisotropy at room temperature assuring a sufficient thermal stability. HAMR can be applied to any type of storage media, including for example, tilted media, longitudinal media, perpendicular media, and/or patterned media.

When applying a heat or light source to the magnetic medium, it is desirable to confine the heat or light to a track where writing is taking place and to generate the write field in close proximity to where the magnetic medium is heated to accomplish high areal density recording. In addition, one of the technological hurdles to overcome is to provide an efficient technique for delivering large amounts of light power to the recording medium confined to sufficiently small optical spots.

One way to achieve small confined hot spots is to use a near-field transducer, such as a plasmonic optical antenna or an aperture, integrated in a waveguide. Light propagating in the waveguide is focused by a focusing element, such as a planar solid immersion mirror into the near-field transducer. However, one of the challenges is to direct the light into the waveguide in a slider associated with the magnetic recording head with low cost, good alignment tolerance, and high light delivery efficiency. Systems and methods for achieving laserin-slider light delivery are disclosed herein.

SUMMARY

Disclosed herein is a waveguide that includes a first cladding layer, the first cladding layer having an index of refraction, $n_3$; a gradient index layer positioned adjacent the first cladding layer; an assist layer positioned adjacent the gradient index layer, the assist layer having an index of refraction, $n_2$; a core layer positioned adjacent the assist layer, the core layer having an index of refraction, $n_1$; and a second cladding layer, the second cladding layer having an index of refraction, $n_4$, wherein $n_1$ is greater than $n_2$, $n_3$, and $n_4$; and $n_2$ is greater than $n_3$ and $n_4$.

Also disclosed herein is a head that includes a light source; and a waveguide that includes: a first cladding layer, the first cladding layer having an index of refraction, $n_3$; a gradient index layer positioned adjacent the first cladding layer; an assist layer positioned adjacent the gradient index layer, the assist layer having an index of refraction, $n_2$; a core layer positioned adjacent the assist layer, the core layer having an index of refraction, $n_1$; and a second cladding layer, the second cladding layer having an index of refraction, $n_4$, wherein $n_1$ is greater than $n_2$, $n_3$, and $n_4$; and $n_2$ is greater than $n_3$ and $n_4$, wherein the light source and the waveguide are configured so that light from the light source is directed into the waveguide.

Also disclosed is a disc drive that includes least one actuator arm having a flexure; at least one head, wherein each flexure has a head at the distal end thereof and wherein each head includes a light source; and a waveguide that includes a first cladding layer, the first cladding layer having an index of refraction, $n_3$; a gradient index layer positioned adjacent the first cladding layer; an assist layer positioned adjacent the gradient index layer, the assist layer having an index of refraction, $n_2$; a core layer positioned adjacent the assist layer, the core layer having an index of refraction, $n_1$; and a second cladding layer, the second cladding layer having an index of refraction, $n_4$, wherein $n_1$ is greater than $n_2$, $n_3$, and $n_4$; and $n_2$ is greater than $n_3$ and $n_4$, wherein the light source and the waveguide are configured so that light from the light source is directed into the waveguide; a magnetic reader; and a magnetic writer.

BRIEF DESCRIPTION OF THE DRAWINGS

FIG. 3 illustrates an exemplary optical waveguide as disclosed herein;

FIGS. 4A, and 4B illustrate an exemplary gradient index (GRIN) layer (FIG. 4A); and a more specific embodiment of an exemplary GRIN layer (FIG. 4B);

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Figure 1:
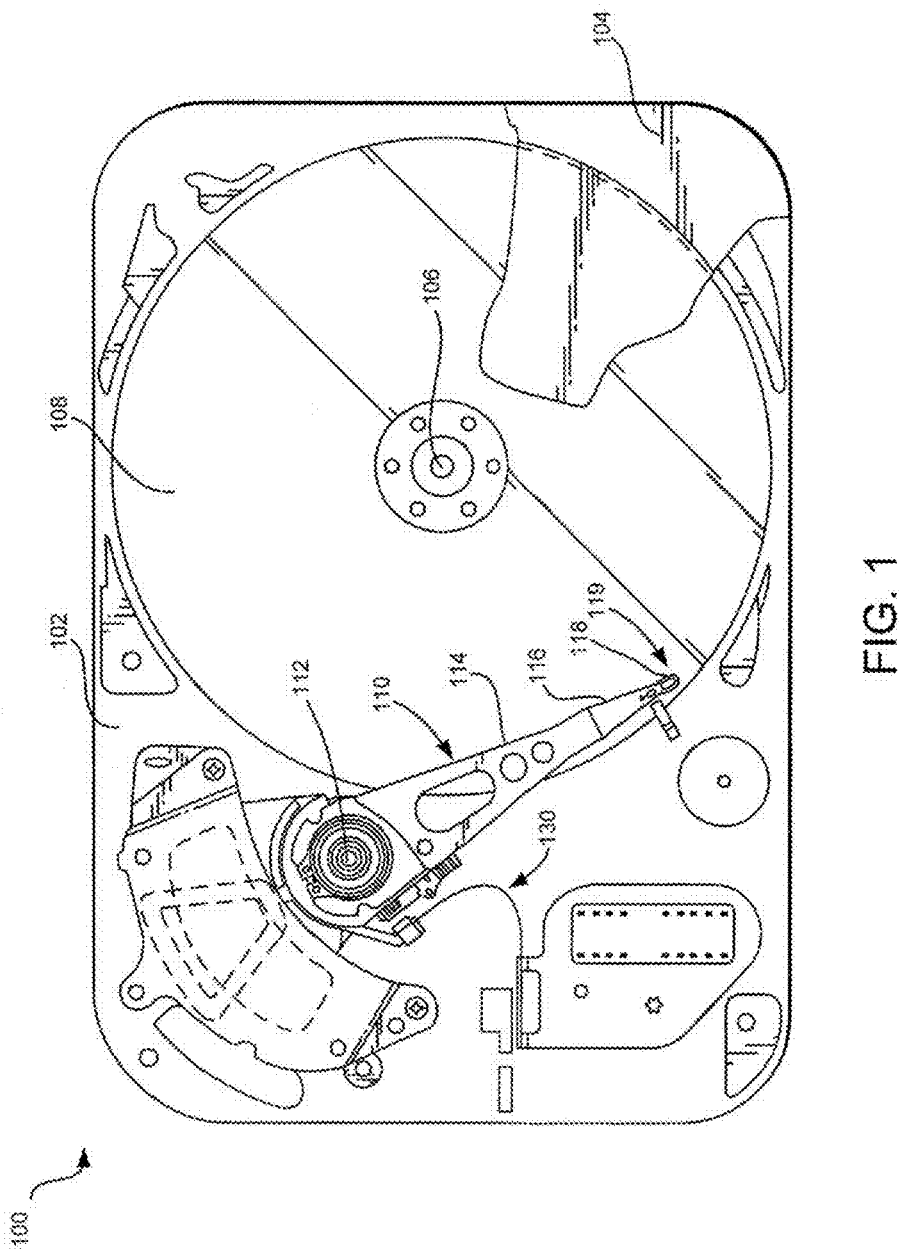
FIG. 1 illustrates a plan view of an example disc drive.

FIG. 1 illustrates a plan view of an example disc drive 100. The disc drive 100 includes a base 102 to which various components of the disc drive 100 are mounted. A top cover 104, shown partially cut away, cooperates with the base 102 to form an internal, clean environment for the disc drive in a conventional manner. The components include a spindle motor 106 that rotates one or more storage medium discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 that extend towards the discs 108, with one or more flexures 116 extending from each of the actuator arms 114. Mounted at the distal end of each of the flexures 116 is a head 118 that includes an air bearing slider enabling the head 118 to fly in close proximity above the corresponding surface of the associated disc 108. The distance between the head 118 and the storage media surface during flight is referred to as the fly height.

During a seek operation, the actuator assembly 110 pivots about the bearing shaft assembly 112 and the transducer heads 118 are caused to move across the surfaces of the discs 108. A flex assembly 130 provides the requisite electrical connection paths for the actuator assembly 110 while allowing pivotal movement of the actuator assembly 110 during operation. The flex assembly 130 also provides power for an on-slider laser light source.

In one implementation, the laser light source 119 (e.g., a laser diode) or other light source (e.g. a light emitting diode (LED)) is mounted on a trailing surface of the head 118 slider. Light from the laser light source 119 is directed into a waveguide also on the trailing surface of the head 118 slider. The light is then redirected and/or focused on a point on the disc 108 in close proximity to a write pole on the head 118 with mirrors. A near-field transducer (NFT) may also be mounted on the head 118 slider to further concentrate the light on the point on the disc 108. In another implementation, one or more of the laser light source 119, waveguide, mirrors, and/or NFT is mounted on an area of the head 118 away from the slider or on a head 118 slider surface other than the trailing surface.

Figure 2:
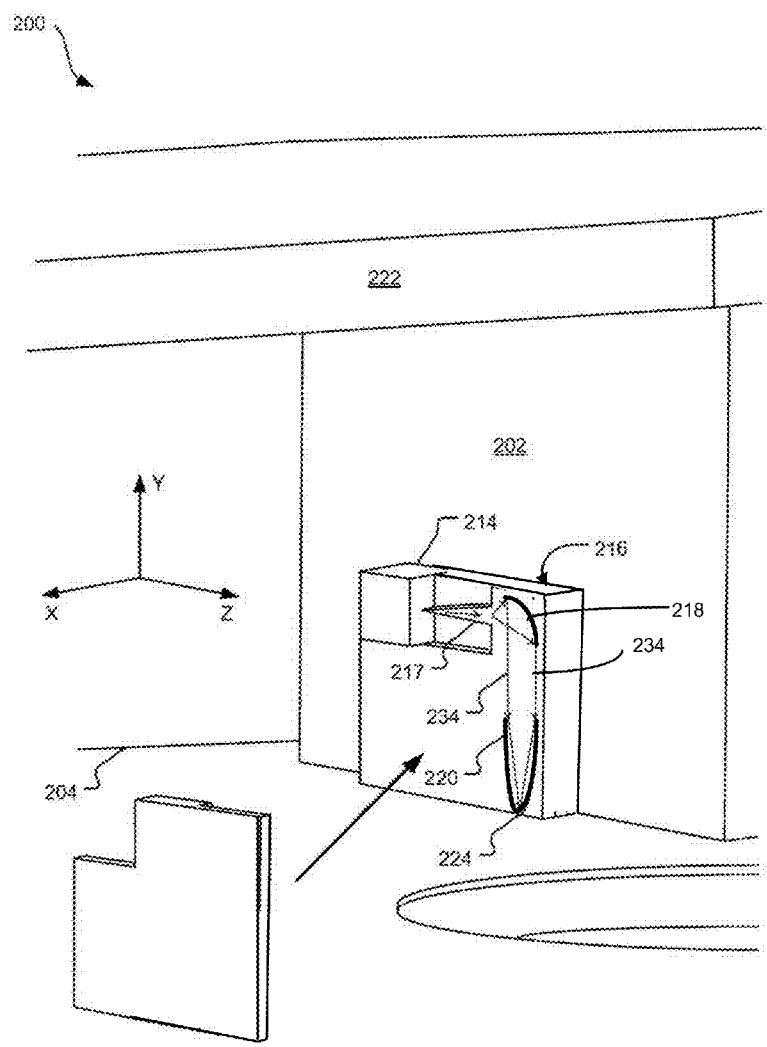
FIG. 2 illustrates an example partial isometric view of a trailing surface of a transducer head slider configured to fly in close proximity to a magnetic media disc with cladding layers, core layers, a laser diode, a waveguide, and mirrors mounted thereon.

FIG. 2 illustrates an example partial isometric view of a trailing surface of a transducer head slider 202 configured to fly in close proximity to a magnetic media disc 204 with a light source (such as a laser diode) 214, a waveguide 216, and mirrors 218, 220 mounted thereon. The laser diode 214, waveguide 216, and mirrors 218, 220 can collectively form one implementation of a laser-in-slider light delivery system 200. Waveguides disclosed herein can be utilized as the waveguide 216 in the exemplary laser-in-slider light delivery system 200.

The slider 202 is located at one end of an actuator arm and is suspended above the magnetic media disc 204 with a suspension 222, sometimes referred to as flexures. The suspension 222 enables the slider 202 to fly in close proximity above the disc 204 as the disc 204 rotates during operation. The laser-in-slider light delivery system 200 is shown attached to a trailing surface of the slider 202, although the system 200 may be attached to other surfaces of the slider 202 and/or transducer head in other implementations.

A laser light source (e.g., the laser diode 214) or other light source (e.g., a light emitting diode (LED)) is shown mounted on the trailing surface of the slider 202. Immediately adjacent to the laser diode 214 is the waveguide 216.

Light rays 234 (illustrated by small arrows in FIG. 2) are emitted from the laser diode 214 (which in some implementations is an edge-emitting laser diode 214) and coupled into the waveguide 216 generally in the Z-direction. The waveguide 216 can include various layers such as those that will be discussed herein.

In embodiments, a waveguide can have a tapered portion 217. The tapered portion 217 of the waveguide 216 can function to confine the light to a tighter mode profile. The mode profile of the light refers to a dimensional size and shape normal to the waveguide plane (the X direction in FIG. 2) as a function of light intensity. In the implementation shown in FIG. 2, a portion of the waveguide 216 is intact in a region occupied by the mirrors 218, 220. Another portion of the waveguide 216 is etched away to form the tapered portion 217. The tapered portion 217 of the waveguide 216 of FIG. 2 has a linear taper in the Z-direction with a narrow opening near the laser diode 214 where the light enters the waveguide 216 (i.e., the waveguide entrance) and a wider opening where the light exits the tapered portion 217 of the waveguide 216. However, in other implementations, the tapered portion 217 may be non-linear and encompass a variety of shapes optimized to achieve a fast mode transformation from one portion of the waveguide 216 to another.

A width of the tapered portion 217 of the waveguide 216 at the tapered portion 217 exit can be selected such that the light rays 234 exiting the tapered portion 217 have a minimum amount of divergence but are still single-mode. In some implementations the light rays 234 exiting the tapered portion 217 are at a fundamental mode. The width of the tapered portion 217 exit may be chosen as wide as possible so that the light rays 234 can be collimated with a collimating mirror 218 having a low numerical aperture in-plane to achieve a manufacture tolerance. In implementations that utilize a channel waveguide to guide the light rays 234 from the tapered portion 217 to an air-bearing surface or near the air-bearing surface where a near-field transducer may be placed, the width of the tapered portion 217 exit and the waveguide taper can be optimized so that the light rays 234 propagating in the channel waveguide are tightly confined.

Light rays 234 exiting the tapered portion 217 are directed toward the collimating mirror 218, which can be an off-axis, single sidewall, parabolic mirror. The collimating mirror 218 makes the divergent light rays 234 exiting from the tapered portion 217 of the waveguide 216 parallel or nearly parallel and re-directs the collimated light rays 234 to the focusing mirror 220. The collimated light rays 234 proceed to the focusing mirror 220 in the negative Y-direction and confined by the waveguide core in the X-direction. The focusing mirror 220, which can be a double sidewall, parabolic mirror, focuses the collimated light rays 234 to a diffraction-limited optical spot 224. In some implementations, the diffraction-limited optical spot 224 can be focused on a location on the magnetic media disc 204. In other implementations, the diffraction-limited optical spot 224 focuses on a near-field transducer. A near-field transducer serves to further condense the light rays 234 to a location on the magnetic media disc 204.

FIG. 2 illustrates one orientation of the collimating mirror 218 and the focusing mirror 220. However, other implementations may vary the size, shape, and/or orientation of the collimating mirror 218 and the focusing mirror 220. Further, some implementations may also utilize straight mirrors to redirect the light rays 234 and/or introduce a phase shift in the mode profile of the light. Commonly assigned U.S. patent application Ser. No. 12/613,458, which describes other embodiments thereof is incorporated in its entirety by reference thereto.

FIG. 3 shows an exemplary waveguide 300. The waveguide 300 can include a first cladding layer 310, a gradient index (also referred to herein as "GRIN") layer 315, an assist layer 320, a core layer 325, and a second cladding layer 330. As seen in FIG. 3, the first cladding layer 310 and the second cladding layer 330 are positioned on both sides of the remaining layers, with the core layer 325 positioned adjacent the assist layer 320 and optionally in this embodiment adjacent the second cladding layer 330 as well. The assist layer 320 is generally positioned between the GRIN layer 315 and the core layer 325. The assist layer 320 can also be described as being positioned adjacent the GRIN layer 315. The GRIN layer 315 can be described as being positioned adjacent the first cladding layer 310. The entire waveguide 300 can be positioned on or formed on or in a substrate 305. Alternatively, a waveguide can be described as including a substrate.

The various layers of the waveguide 300 can be made of various materials and can have various indexes of refraction. In embodiments, a waveguide 300 can be described by the core layer 325 having a first index of refraction, $n_1$; the assist layer 320 having a second index of refraction, $n_2$; the first cladding layer 310 having a third index of refraction, $n_3$; and the second cladding layer 330 having a fourth index of refraction, $n_4$. The first, second, third, and fourth indices of refraction can be related in various ways.

In an embodiment, $n_1$ is greater than $n_2$, $n_3$, and $n_4$; and in an embodiment, $n_1$ is substantially greater than $n_2$, $n_3$, and $n_4$. In an embodiment, $n_2$ is greater than both $n_3$ and $n_4$; and in an embodiment, $n_2$ is substantially greater than $n_3$, and $n_4$. In embodiments, both $n_1$ and $n_2$ are independently greater than both of $n_3$ and $n_4$. In embodiments, $n_3$ and $n_4$ may be substantially the same; in embodiments, $n_3$ and $n_4$ may be the same; and in embodiments, the first cladding layer 310 and the second cladding layer 330 may be made of the same material, and therefore have the same index of refraction.

The first cladding layer 310 and the second cladding layer 330 may independently be made of materials having desired indices of refraction. The cladding layers can generally be made of materials that are dielectric and have a low index of refraction. Exemplary materials can include, for example $Al_2O_3$ (alumina), $SiO_2$, and $MgF_2$. The first cladding layer 310 and the second cladding layer 330 can be made of the same materials or different materials. In embodiments, the first cladding layer 310 and the second cladding layer 330 are made of the same materials. The first and second cladding layers are generally thick enough so that the article functions as a waveguide.

The assist layer 320 can generally be made of materials that are dielectric and have an index of refraction that is higher than that of the first cladding layer 310 and the second cladding layer 330. The assist layer 320 can generally be made of a material that can function to enhance the light coupling efficiency from the light source (for example laser diode 214 in FIG. 2) to the core layer 325. Exemplary materials can include, for example $SiON_x$, $ZnS$—$SiO_2$. The thickness of the assist layer 325 can be chosen such that the mode profile of the waveguide 300 at the entrance substantially matches that of the light source (for example laser diode 214 in FIG. 2)

The core layer 325 can generally be made of materials that are dielectric and have an index of refraction that is higher than, or substantially higher than, that of the first cladding layer 310, the second cladding layer 330, and the assist layer 320. The core layer 325 can generally be made of a material that because of its properties and the materials around it in the waveguide 300, can function to trap light in the core layer 325. The core layer 325 therefore allows light to exit only out of the waveguide 300, as seen in FIG. 2. Exemplary materials can include, for example $Ta_2O_5$, $TiO_x$, $SiN_x$, SiC, ZnS, and $Nb_2O_5$. The thickness of the core layer 325 can be chosen such that the mode profile of the waveguide 300 substantially matches that of the light source (for example laser diode 214 in FIG. 2).

The GRIN layer 315 can generally be made so that the local index of refraction varies along an axis, for example the X-axis (as noted in FIG. 2). The variable index of refraction generally has a higher magnitude near the assist layer 320 than it does near the first cladding layer 310. Due to the nature of light, the GRIN layer 315 will bend the light towards the assist layer 320. One exemplary way of forming a GRIN layer 315 is to co-deposit two different materials. Yet another exemplary way of forming a GRIN layer 315 is to deposit a plurality of bilayers.

FIG. 4A illustrates an exemplary embodiment of a GRIN layer 415. This GRIN layer 415 includes four (4) sets of bilayers 416a, 416b, 416c, and 416d. In embodiments, a GRIN layer can include, for example, a plurality of bilayers, at least three sets of bilayers, at least four sets of bilayers, at least five sets of bilayers, or any number of bilayers. Each individual set of bilayers, for example 416a includes two layers, first layer 417a and second layer 418a. Each individual set of bilayers can have a total thickness that is the same or different than any other individual set of bilayers. In an embodiment, each set of bilayers has a total thickness that is the same as any other set of bilayers in a GRIN layer. Each set of bilayers can have a total thickness that is lower than the wavelength of light from the light source. In embodiments, each set of bilayers can have a total thickness that is lower than ½ the wavelength of light from the light source.

For the sake of clarity, the "first layer" in each bilayer in the illustrated embodiment is the layer that is closer to the bottom or the first cladding layer 310. In embodiments, the first layer 417a can have a different index of refraction, a different material, a different thickness, or some combination thereof than does the second layer 418a. In embodiments, the first layers 417a, 417b, 417c, and 417d can have higher indices of refraction than their corresponding second layers 418a, 418b, 418c, and 418d. In embodiments, the first layers 417a, 417b, 417c, and 417d can have different thicknesses than their corresponding second layers 418a, 418b, 418c, and 418d. In embodiments, the first layers 417a, 417b, 417c, and 417d can be made of a different material than their corresponding second layers 418a, 418b, 418c, and 418d. In embodiments, the first layers 417a, 417b, 417c, and 417d can all be made of the same material with the same index of refraction, but can have different thicknesses; the second layers 418a, 418b, 418c, and 418d can all be made of the same material (but different than that of the first layers 417a, 417b, 417c, and 417d), with the same index of refraction, but can have different thicknesses; and each set of bilayers 416a, 416b, 416c, and 416d can have the same total thickness.

FIG. 4B illustrates a specific embodiment of a portion of a waveguide including an exemplary GRIN layer 415b. This portion of the waveguide includes an assist layer 420 that is made of $SiON_x$, and has a thickness of about 500 nm; and a first cladding layer 410 that is made of $Al_2O_3$. The GRIN layer 415b includes five bilayers 466a, 466b, 466c, 466d, and 466e. Each of the bilayers has a total thickness of about 350 nm. Each bilayer includes a layer of $Al_2O_3$ and a layer of $SiON_x$. As seen in FIG. 4B, the thicknesses of the individual layers in each bilayer is different bilayer to bilayer.

In embodiments, the index of refraction of the materials and the thicknesses of the individual layers in the bilayers of a GRIN layer for a transverse electric (TE) mode can be described by the following equation, wherein $n_{eff}$=the effective index of refraction of the bilayers; $n_1$=the index of refraction of the first layer; $n_2$=the index of refraction of the second layer; $t_1$=the thickness of the first layer; and $t_2$=the thickness of the second layer.

$$n_{eff} = \sqrt{\frac{n_1^2 t_1 + n_2^2 t_2}{t_1 + t_2}}$$

For a transverse magnetic (TM) mode, it is $$n_{eff} = \sqrt{\frac{n_1^2 n_2^2 (t_1 + t_2)}{n_2^2 t_1 + n_1^2 t_2}}$$

Once materials are determined, and thereby the indices of refraction of the materials (the choice of materials can be based at least in part on the other materials in the waveguide, processing considerations, durability of the materials, other considerations not mentioned herein, or some combination thereof) this equation can be utilized to determine the thickness of each individual layer in the bilayers so that the overall function of the GRIN layer, to have a variable index of refraction that generally has a higher magnitude near the assist layer 320 than it does near the first cladding layer 310, is achieved. In embodiments, the variation of the indices of refraction along the X direction of the GRIN layer follows a hyperbolic secant function.

Figure 5:
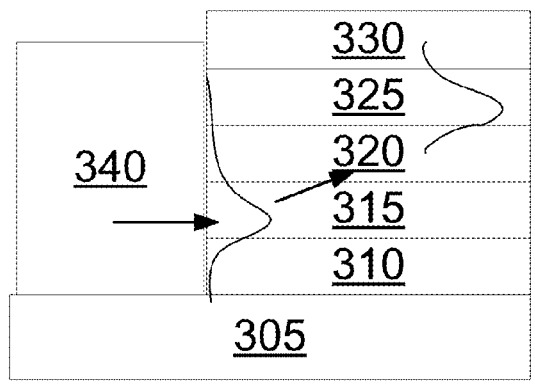
FIG. 5 illustrates light traveling through an exemplary embodiment of a waveguide disclosed herein.

FIG. 5 shows the light delivery for vertical alignment (along the X direction, as presented in FIG. 2). Light exiting the light source 340 into the GRIN layer 315, because of the nature of light, will be directed toward the assist layer 320 and eventually into the core layer 325 (after which it can optionally be further directed with mirrors as indicated in co-pending, commonly assigned U.S. patent application Ser. No. 12/613,458).

Figure 6:
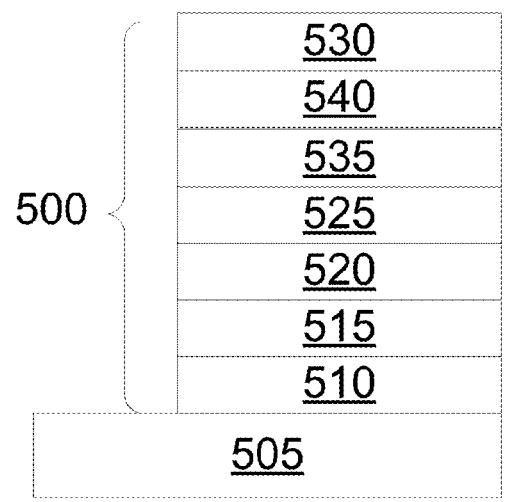
FIG. 6 illustrates an exemplary optical waveguide as disclosed herein.

FIG. 6 illustrates another embodiment of a waveguide 500. This exemplary embodiment includes a first cladding layer 510, a second cladding layer 530, and a core layer 525 as discussed previously. The waveguide 500 also includes a first GRIN layer 525 that is adjacent the first cladding layer 510 as before, and a second GRIN layer 540 that is adjacent the second cladding layer 530. The first and second GRIN layers 515 and 540 can be the same or different and can be formed as discussed above. The waveguide 500 also includes a first assist layer 520, that is adjacent to the first GRIN layer 515 and the core layer 525 as before; and a second assist layer 535 that is adjacent the second GRIN layer 540 and the core layer 525. The first and second assist layers 520 and 535 can be the same or different and can be formed as discussed above. The second assist layer 535 can have an index of refraction that is the same as the first assist layer 520, $n_2$; or it can have a different index of refraction, $n_5$. In embodiments where the second assist layer 535 has a different index of refraction ($n_5$), $n_5$ can be less than $n_1$, but greater than $n_3$ and $n_4$ (where $n_1$, $n_3$, and $n_4$ are as described above).

Figure 7:
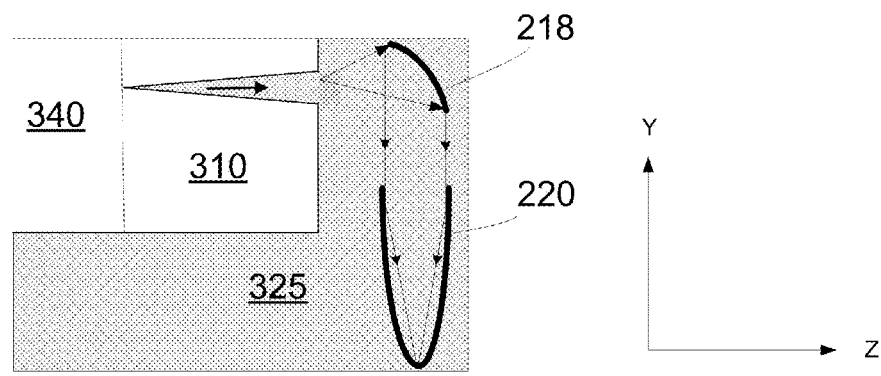
FIG. 7 illustrates light passing through a disclosed waveguide having a tapered core layer and reflecting off exemplary mirrors.

One or more portions or layers of a waveguide can be tapered in the Z direction (as described in FIG. 2). FIG. 7 illustrates an exemplary embodiment where only the core layer of the waveguide is tapered. As seen there, the core layer 325 has a linear taper, however, the taper of the core layer need not be linear and can have any shape to achieve fast mode transformation from the assist layer 320 (not shown in FIG. 7) to the core layer 325 with a relatively high efficiency. The taper shown in FIG. 7 is narrower at the opening (nearest to the light source 340) than it is at the end. The end width of the taper can be set such that the waveguide is a single mode waveguide. If channel waveguide light delivery is desired, the end width, hence, the width of the channel waveguide afterward may be chosen to achieve a tightly confined mode. If mirrors (such as mirrors 218 and 220) are used to focus the light, the end width may be chosen as wide as possible so that the light exiting from the waveguide taper can be collimated with a mirror having a low f number.

Figure 8A:
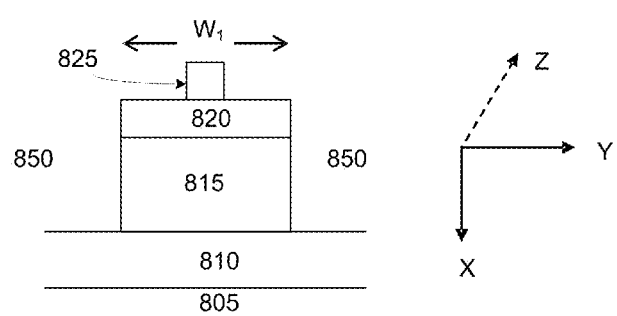
FIGS. 8A and 8B illustrate two different cross sections of a portion of a waveguide having a tapered core layer, GRIN layer, and assist layer.

In another embodiment, the core layer, the assist layer, and the GRIN layer can all be tapered. In an exemplary embodiment, seen in FIGS. 8A and 8B, the core layer 825 can be tapered differently than the assist layer 820 and the GRIN layer 815. As seen in FIG. 8A, the first cladding layer 810 is positioned on or adjacent a substrate 805; the GRIN layer 815 is positioned on or adjacent a first cladding layer 810; the assist layer 820 is positioned on or adjacent a GRIN layer 815; and the core layer 825 is positioned on or adjacent an assist layer 820. All of the layers can have their respective properties and materials as discussed above. The embodiment depicted in FIGS. 8A and 8B can also have other layers not shown therein, for example it could have a second cladding layer; or it could have a second cladding layer, a second assist layer and a second GRIN layer.

Figure 8B:
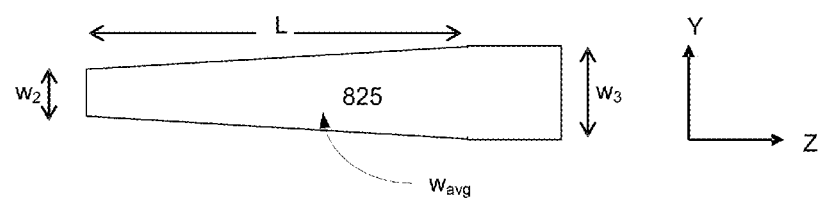

The core layer 825 can be patterned to form a waveguide taper having a narrower width facing the laser diode ($w_2$) than the width at the exit of the waveguide ($w_3$) as shown in FIG. 8B. The light exiting from the laser diode is first coupled into the assist layer 820, and then to the core layer 825 through mode transformation along the waveguide taper. The waveguide taper may be linear or any other shapes to achieve fast mode transformation from the assist layer 820 to the core layer 825 with high efficiency. The GRIN layer 815 and the assist layer 820 can be patterned with a channel waveguide of width $W_1$, and cladded by additional cladding material 850. The additional cladding material 850 could be the same or different than the first cladding layer 810 and second cladding layer (not shown). The channel width $W_1$ may be constant along the propagation direction or tapered for optimized optical efficiency. The taper of the core layer 825 can also be described by the average width, $w_{avg}$. In embodiments, $w_{avg}$ can range from about 0.05 micrometers to about 50 micrometers; and in some embodiments from about 0.1 micrometers to about 0.5 micrometers.

In embodiments, such as that depicted in FIG. 8A, various properties of the respective layers can have various effects. For example, the thickness of the assist layer 820 can be set to match the mode profile of the output of the light source at the x-axis; $w_1$ can be set to match the mode profile of the light source at the y-axis; and $w_{avg}$ can be set so that the effective mode index of the core layer 825 is equal to that of the assist layer 820.

Also disclosed herein are heads, such as that depicted in FIG. 1 that can include waveguides such as those described herein. Such exemplary heads can also include light sources. Exemplary light sources can include, for example, laser diodes, light emitting diodes (LEDs), edge emitting laser diodes (EELs), vertical cavity surface-emitting lasers (VCSELs), and surface emitting diodes.

Disc drives are also disclosed herein. Such disc drives include optical waveguides as described herein. An exemplary disc drive can be seen in FIG. 1. A disc drive can include at least one actuator arm having a flexure, at least one head, wherein each flexure has a head at the distal end thereof and wherein each head can include a light source; a magnetic reader; and a magnetic writer.

While implementations of the waveguide, disclosed herein are discussed specifically with regard to heat assisted magnetic recording technology applications, the presently disclosed technology is equally applicable to any optics system (e.g., photonic integrated circuits) where precise light delivery at very low loss is desired. For example, the presently disclosed technology may be applied to fiber-optic communication systems, biomedical devices, and photonic computing devices, for example.

Waveguides such as those disclosed herein can be made using commonly utilized techniques including for example, deposition techniques, such as physical vapor deposition (PVD), chemical vapor deposition (CVD), and atomic layer deposition (ALD) for example; and etching techniques, such as reactive ion etching (RIE), chemical etching, and chemical mechanical polishing (CMP), for example.

EXAMPLES

While the present disclosure is not so limited, an appreciation of various aspects of the disclosure will be gained through a discussion of the examples provided below.

Example 1

Optical Waveguide with a Tapered Core Layer

A waveguide similar to that described in FIG. 4B and tapered like FIG. 7 (only the core layer was tapered) was modeled to show the advantage of including a GRIN layer. The modeling assumed that the core layer (core layer 325 in FIG. 3) was 120-nm thick $Ta_2O_5$ with an index of refraction, n=2.10; the cladding layers (first cladding layer 310 and second cladding layer 330 in FIG. 3) were $Al_2O_3$, with an index of refraction, n=1.65; and the assist layer (assist layer 320 in FIG. 3) was $SiON_x$ with an index of refraction, n=1.70. The GRIN layer was composed of five bilayers, each with an $Al_2O_3$ and a $SiON_x$ layer, as shown in FIG. 4B. Each bi-layer was 350 nm thick and the thickness ratio between them varies linearly (as seen in FIG. 4B), resulting in a linear change in the effective index for transverse electric (TE) waveguide modes. There is no truncation in the GRIN layers. The core was structured with a $Ta_2O_5$ waveguide taper surrounded by $Al_2O_3$. The taper was linear with a start width $w_2$=100 nm, an end width $w_3$=600 nm, and it was L=100 μm long ($w_2$, $w_3$, and L see FIG. 8B). The laser diode was edge emitting with the junction parallel to the waveguide plane (YZ plane). The full-width-at-half-maximum beam size at the output facet was 0.487 micrometers normal to the junction and 2.43 micrometers parallel to the junction.

Figure 9:
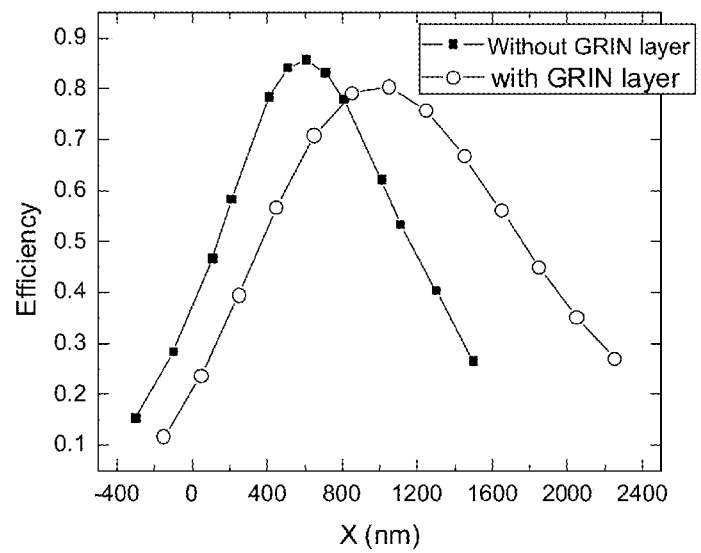
FIG. 9 is a graph showing computed light delivery efficiency versus the diode vertical position when used with a disclosed optical waveguide.

FIG. 9 shows the computed light delivery efficiency versus the diode vertical position X. It is evident that the GRIN layer does improve the vertical positioning as the efficiency<70%. For instance, the width in X at efficiency=50% is increased from 1 μm to 1.4 μm.

Figure 10:
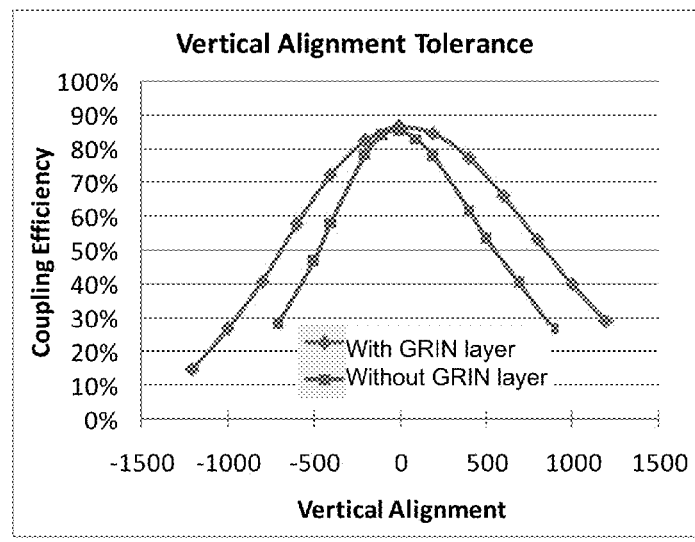
FIG. 10 is a graph showing the computed coupling efficiency versus the vertical tolerance of a disclosed optical waveguide.

FIG. 10 shows the coupling efficiency of the waveguide described above to a diode light source. As seen from FIG. 10, the addition of a GRIN layer affords a broader peak at which the coupling efficiency is high; this can be advantageous because it allows for lower tolerances in aligning the light source with the waveguide.

Example 2

Optical Waveguide with a Tapered Core Layer, Assist Layer and Core Layer with Channel This example modeled a core layer that was 120 nm thick $Ta_2O_5$ with an index of refraction $n_1$=2.10; first and second cladding layers as well as cladding material for the patterned GRIN and the assist layer was $Al_2O_3$, with an index of refraction $n_3$ and $n_4$=1.65. The assist layer was a 500-nm thick $SiO_xN_y$, with an index of refraction $n_2$=1.70. The GRIN layer had a hyperbolic secant index profile: $n(x)=n_0$ sech $[\alpha (h-x)]$, having $n_0$=1.69, $\alpha$=0.12 (1 m)$^{-1}$. (h was set such that n=$n_0$ at the assisted layer/GRIN interface.) The total thickness of the GRIN layer was 1.75 μm; and it had a five $[Al_2O_3(t_1)/SiO_xN_y(t_2)]$ bi-layer structure. The thickness of each bi-layer was fixed and of sub-wavelength: $t_1+t_2$=350 nm. For a TE (transverse-electric) mode, the local thickness of each layer in one bi-layer as determined by $$n(x) = \sqrt{\frac{n_1^2 t_1 + n_2^2 t_2}{t_1 + t_2}}.$$

Here $n_1$ denotes the index of refraction for $Al_2O_3$, and $n_2$ for $SiO_xN_y$. The waveguide taper in the core layer had a start width $W_2$=100 nm, end width $W_3$=700 nm, and the length, L=100 μm long. The laser diode was a TE mode, edge emitting with the junction parallel to the waveguide plane (YZ plane). The full-width-at-half-maximum beam size at the output facet was 0.487 μm normal the junction and 2.43 μm parallel to the junction.

Figure 11:
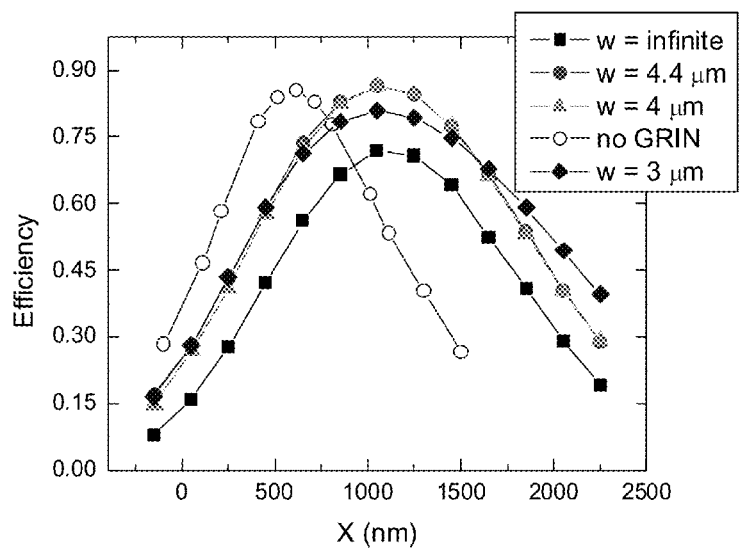
FIG. 11 is a graph showing the computed coupling efficiency versus the diode vertical position of disclosed optical waveguides having different GRIN layer and assist layer widths.
Figure 12:
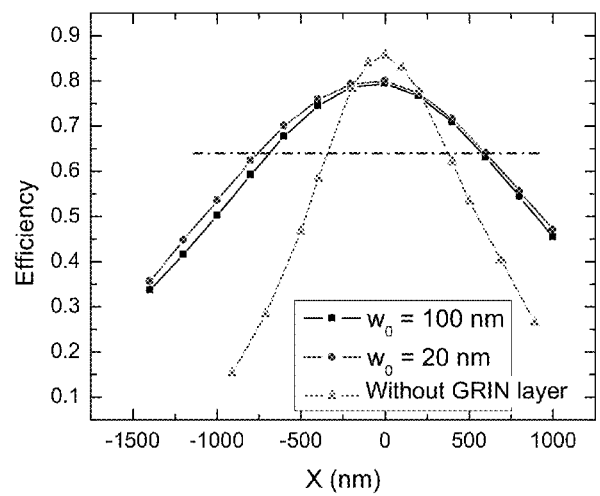
FIG. 12 is a graph showing the computed coupling efficiency versus the vertical tolerance of disclosed waveguides having two GRIN layers with different core layer taper starting widths.

The width, $W_1$ of the GRIN layer and assist layer was varied, as seen in FIG. 11. FIG. 11 shows the computed input coupler efficiency versus the diode vertical position X at various channel widths $W_1$ ($w_1$=infinite means that the GRIN layer and the assist layer were not patterned.) FIG. 12 shows that patterning at a channel width w=4 μm enhances the peak efficiency by 20%, comparing to that without patterning (w=infinite), which brings up the peak efficiency comparable to no GRIN layer. At an efficiency equal to 64%, the patterned structure also improves the laser diode-waveguide vertical positioning tolerance by 60%. Again, improving the positioning tolerance allows greater tolerances in manufacturing methods.

Example 3

Optical Waveguide with Two Grin Layers

The waveguide modeled in this example included an alumina ($Al_2O_3$) first cladding layer with an index of refraction of n=1.65/a GRIN layer as described in Example 2 above/a 300-nm thick $SiO_xN_y$, with an index of refraction $n_2$=1.70/120 nm thick $Ta_2O_5$ with an index of refraction $n_1$=2.10/a 300-nm thick $SiO_xN_y$, with an index of refraction $n_2$=1.70/a GRIN layer as described in Example 2 above/an alumina ($Al_2O_3$) second cladding layer with an index of refraction of n=1.65. The Core layer (Ta2O5) had taper start widths $w_2$=20 nm and 100 nm (as seen in FIG. 12), and an end width $w_3$=700 nm; and the taper was L=100 micrometers long. As seen from FIG. 12, at 64% efficiency or better, the alignment tolerance increases from 0.72 micrometers to 1.356 micrometers, although the peak efficiency does drop from 87% to 80%.

Thus, embodiments of LIGHT DELIVERY WAVEGUIDES are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A waveguide having a first axis, the waveguide comprising:
    a first cladding layer, the first cladding layer having an index of refraction, $n_3$;
    a gradient index layer positioned adjacent the first cladding layer, the gradient index layer having a local index of refraction that varies along the first axis of the waveguide;
    an assist layer positioned adjacent the gradient index layer, the assist layer having an index of refraction, $n_2$; and
    a core layer positioned adjacent the assist layer, the core layer having an index of refraction, $n_1$;
    wherein $n_1$ is greater than $n_2$, and $n_3$; and $n_2$ is greater than $n_3$.

2. The waveguide according to claim 1, wherein the gradient index layer has an index of refraction that is higher near the assist layer than it is near the first cladding layer.

3. The waveguide according to claim 1, wherein the gradient index layer comprises a plurality of bilayers.

4. The waveguide according to claim 3, wherein each set of bilayers has a total thickness that is the same as any other set of bilayers.

5. The waveguide according to claim 3, wherein the gradient index layer comprises at least three bilayers.

6. The waveguide according to claim 3, wherein the thicknesses of the individual layers varies from one surface of the gradient index layer to the other.

7. The waveguide according to claim 1 further comprising:
    a second assist layer, the second assist layer positioned adjacent the core layer; and
    a second gradient index layer positioned adjacent the second assist layer.

8. The waveguide according to claim 7, wherein the second assist layer has an index of refraction of $n_2$.

9. The waveguide according to claim 1, wherein the core layer comprises a tapered region.

10. The waveguide according to claim 9, wherein the average width of the tapered region is from about 0.05 micrometers to about 50 micrometers.

11. A device comprising:
    a light source; and
    a waveguide comprising:
        a first cladding layer, the first cladding layer having an index of refraction, $n_3$;
        a gradient index layer positioned adjacent the first cladding layer, the gradient index layer having a local index of refraction that varies along the first axis of the waveguide;
        an assist layer positioned adjacent the gradient index layer, the assist layer having an index of refraction, $n_2$;
        a core layer positioned adjacent the assist layer, the core layer having an index of refraction, $n_1$; and
        wherein $n_1$ is greater than $n_2$, and $n_3$; and $n_2$ is greater than $n_3$,
    wherein the light source and the waveguide are configured so that light from the light source is directed into the waveguide.

12. The device according to claim 11, wherein the light source is selected from a laser diode, a light emitting diode (LED), an edge emitting laser diode (EEL), a vertical cavity surface-emitting laser (VCSEL), or a surface emitting diode.

13. The device according to claim 11, wherein the gradient index layer comprises a plurality of bilayers.

14. The device according to claim 11, wherein the gradient index layer has an index of refraction that is higher near the assist layer than it is near the first cladding layer.

15. The device according to claim 11, wherein each set of bilayers has a total thickness than is less than the wavelength of light from the light source.

16. The device according to claim 14, wherein the thicknesses of the individual layers varies from one surface of the gradient index layer to the other.

17. The device according to claim 11, wherein the waveguide further comprises:
    a second assist layer, the second assist layer positioned adjacent the core layer; and
    a second gradient index layer positioned adjacent the second assist layer.

18. A disc drive comprising:
    at least one actuator arm having a flexure;
    at least one head, wherein each flexure has a head at the distal end thereof and wherein each head comprises:
        a light source; and
        a waveguide comprising:
            a first cladding layer, the first cladding layer having an index of refraction, $n_3$;
            a gradient index layer positioned adjacent the first cladding layer, the gradient index layer having a local index of refraction that varies along the first axis of the waveguide;

an assist layer positioned adjacent the gradient index layer, the assist layer having an index of refraction, $n_2$;

a core layer positioned adjacent the assist layer, the core layer having an index of refraction, $n_1$; and wherein $n_1$ is greater than $n_2$, and $n_3$; and $n_2$ is greater than $n_3$, wherein the light source and the waveguide are configured so that light from the light source is directed into the waveguide;

a magnetic reader; and a magnetic writer.

19. The disc drive according to claim 18, wherein the gradient index layer comprises at least three bilayers.

20. The disc drive according to claim 18, wherein the gradient index layer has an index of refraction that is higher near the assist layer than it is near the first cladding layer.

* * * * *